March 9, 1943.  P. M. L. LATROBE  2,313,489
MANUFACTURE OF DECORATED PRODUCTS PERMEABLE TO THE
LUMINOUS RAYS AND PRODUCTS OBTAINED THEREFROM
Filed April 29, 1939

Patented Mar. 9, 1943

2,313,489

UNITED STATES PATENT OFFICE 2,313,489

MANUFACTURE OF DECORATED PRODUCTS PERMEABLE TO THE LUMINOUS RAYS AND PRODUCT OBTAINED THEREFROM

Pierre Michel Louis Latrobe, Paris, France; vested in the Alien Property Custodian Application April 29, 1939, Serial No. 270,935
In France April 30, 1938

5 Claims. (Cl. 41—21)

The present invention has for its object a process of manufacturing decorated objects permeable to the lumious rays according to which a first resistant carrier of flexible and transparent material is provided with a grid of juxtaposed reliefs and depressions for instance parallel ribs and grooves as which cannot be individually distinguished by the naked eye under normal conditions of observation, and is successively angularly displaced on a second carrier of a material which is more flexible than the first carrier (that is to say, mouldable, such as a metallic foil); and a pressure is locally exerted on the first carrier, after each of its changes of orientation, in such a way as to produce throughout all the desired portion of the second carrier and according to the correspondent orientation, a "local moulding" of reliefs and depressions of the grid. Each of the local mouldings thus obtained has its own orientation, its own sizes and periphery with reference to the other local mouldings. A set of moulded grids of various orientations is thus obtained on the second carrier. Then, a mass of material permeable to luminous rays is moulded on the said set of grids thus used as a mould or matrix in such a way as to form a moulded piece permeable to the luminous rays, the face or side of which in contact with the mould or matrix presents grids in differing orientation in which the reliefs and depressions cannot be distinguished individually by naked eye under normal conditions of observation. Finally, the moulded piece thus manufactured is separated from its mould or matrix.

In some cases, especially in the case where the moulding of the material permeable to the luminous rays is to be made under pressure, a stiff or rigid counter-type of the second carrier provided with the set of grids having various orientations can be manufactured by galvanoplasty, stamping, moulding, or any other means, and the mass permeable to the luminous rays is then moulded as above with the said countertype as a mould or matrix.

According to the invention, decorated glass windows, stained-glass windows, films and many other articles permeable to the luminous rays can be manufactured.

By way of examples of materials particularly suitable for execution of this method, the following can be quoted: Celluloid permeable to luminous rays, gelatine and rhodoid permeable to luminous rays, transparent organic plastic materials; artificial resin compounds such as urea formaldehyde resin, vinyl-resin, etc.; vitrified material, glass, crystal, etc.

The material permeable to the luminous rays thus utilised can be moulded in any desired manner on the set of grids used, for instance it can be:

(a) Taken in a fluid condition and run on the mould.

(b) Taken in a solid condition and made mouldable by any suitable thermal, chemical or other plasticizing treatment and, in that condition, applied with pressure against the set of grids of various orientations until such time as its mass has penetrated into all the depressions of that set of grids; for instance, in the case where the material to be moulded is Celluloid permeable to the luminous rays, the same can be made mouldable by heating or by a suitable solvent.

Again, according to the present invention, the moulded piece obtained by the method defined in the foregoing can have a face oriented parallel to the general surface of the mould; in that case the thickness of that piece can be (a) Sufficiently thin for giving a flexible moulded piece which is for instance in the shape of a film, (b) Sufficiently thick for giving a rigid moulded piece in a form similar to that of a plate or plate-glass.

It is of course understood, likewise, that this moulded piece can also be made in the form of a solid of any desired shape.

In the case where the moulded and decorated product offers two large parallel faces, in particular in the case where this product is a film or a plate-glass, decorations of the aforegoing type can be established on each of these two large faces; moreover, those decorations can be obtained simultaneously by moulding under pressure of those two faces between two sets of grids, each of these sets being made of grids differently oriented corresponding to the decoration to be produced on the said face.

Figure 1:
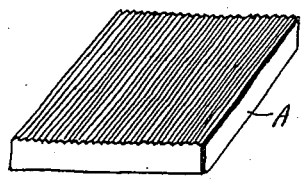
Figure 1 is a perspective view of a fragment of the first carrier with its grid of juxtaposed reliefs and depressions, being shown on an enlarged scale.

In the drawing, a first resistant carrier A is prepared with a grid of juxtaposed reliefs and depressions. These are illustrated as substantially parallel ribs which are on such an enlarged scale that they are visible in the drawing, but it will be understood that in fact they are so small and closely spaced that they cannot be individually distinguished by the naked eye under normal conditions of observation.

Figure 2:
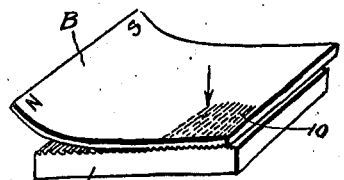
Figure 2 is a perspective view indicating the formation of a part of the second carrier.

A matrix or second carrier B is of more flexible material than that of the first carrier A and is pressed against the first carrier at a predetermined region 10 as indicated in Fig. 2, until its surface of pressure contact with the first carrier A becomes indented with the complement of the surface of the first carrier A throughout this predetermined area. In Figure 2, this condition is indicated by the dotted lines to indicate that this impression is being accomplished at the underside of the sheet B.

Figure 3:
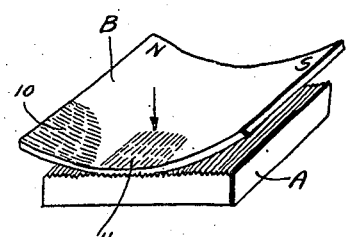
Figure 3 is a corresponding view, showing the formation of a further part of the second carrier.

Following this impression of the region 10, the second carrier B is changed in orientation, and a further region 11 is then impressed in a similar manner, as indicated by Fig. 3. Between Figs. 2 and 3, the corners N, S have been shifted by this change of orientation; and the regions 10, 11 are subjected to pressure in the direction of the arrows.

Figure 4:
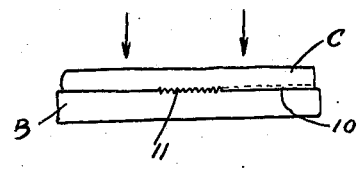
Figure 4 is an end view, indicating the operation of forming the article.

When the imprinting has been accomplished over the desired portions of the second carrier B and at respective orientations as desired, a layer C of theremoplastic material is placed upon the second carrier B and pressed thereagainst as indicated by the arrows in Fig. 4, until it provides a counterpart of the matrix or second carrier B.

Figure 5:
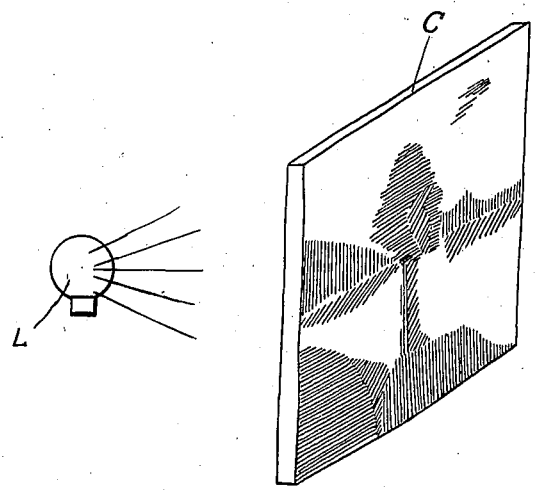
Figure 5 is a perspective view indicating the employment of the article.

The material of the plastic layer or film C is permeable to luminous rays, so that this sheet of impressed material can be employed in front of a source of light L, as shown in Fig. 5, to reveal the ornamentation which has been produced thereon.

In each of the figures, it will be understood that small fragments of a structure are illustrated to correspond with the great enlargement of the ribs and grooves shown on the first carrier A.

In the case where the moulded object has to be given the shape of a solid, several faces or sides of this product can be provided with decorations obtained simultaneously by moulding, decoration of each of those faces or sides being produced with the help of a set of grids of the type already described. It is of course understood that the decorations of those various faces or sides can be completely different one from the other and likewise, can be arranged in any desired manner, one in relation with the other.

The articles formed as films, sheets, and bodies of various shapes, as formed by the methods herein described, constitute new industrial products and come within the scope of the present invention.

The present invention, likewise, deals with the various applications which can be made of these industrial products.

Thus, this product is in the form of a film:

1. The film may be affixed on one of the faces of a stiff carrier, permeable to the luminous rays for instance, a plate-glass or window-pane, by means of an adhesive substance or cement which itself is permeable by luminous rays.

2. The film may be affixed between two stiff carriers, permeable to luminous rays, two plate-glasses or panes for instance.

3. When the moulded film is affixed to a stiff carrier or is mounted between two stiff carriers, permeable to luminous rays, such stiff carriers themselves may be provided with their own decoration the decorative effects of which give rise to particular effects owing to their combination with the effects due to the decorated film with which the carrier is combined.

4. Any desired parts of the product permeable to luminous rays having the aforementioned grids of reliefs and depressions, or even parts reliefs and of those depressions, may be provided with opaque coatings, and the said coatings may be reflecting.

5. The film may be mounted in a frame, such as a lead-frame similar to the lead-frames used for the manufacture of the stained-glass windows, the said film being suitably stretched in this frame.

It is obvious, also, that a film fixed on a plate-glass or pane can also be mounted in a lead-frame of the above kind.

On any face of a product decorated in accordance with the invention, such face being or not being provided with grids differently oriented of reliefs and depressions, any other complementary decorative means can likewise be utilised in combination with the grids of reliefs and depressions upon that product, as much in respect of the parts of those faces provided with these grids as the parts of those faces which are not provided with a set of grids and as the faces which are devoid of any set of grids of the aforementioned type.

The present invention makes it possible to make decorated objects of great originality and capable of giving, on the one hand, decorative effects of infinite variety, which under the action of light by reflection, diffraction, transparency, and refraction give very particular plays of light which vary with the angle at which those objects are observed.

Those plays of light can be made still more varied by use of different colourings, either of the material permeable by luminous rays constituting those products themselves, or by utilisation of coloured coatings applied on those products.

It should be pointed out by way of an example, that the objects decorated in accordance with the invention and produced in the form of a film or plate-glass can be utilised, in particular, as elements of decorated glass windows, corresponding to stained-glass windows.

In the foregoing description and in the claims, the term transparent material should be taken as meaning any material permeable to luminous rays which are perceptible to the eye, whether that material is coloured or uncoloured, transparent or translucent.

By way of example, in the case where a Celluloid film permeable to the luminous rays is to be made on a mould or matrix of the described kind, a sufficient quantity of a solvent such as amyl acetate is at first poured on the said mould or one end of the same; the Celluloid sheet is applied on the said solvent and mould; then with a roller a pressure is exerted at first on the part of the Celluloid sheet provided with the solvent and then on the remaining part of the sheet in order to distribute the solvent on the whole surface of the sheet and the mould or matrix and at the same time suitably apply the said sheet against this mould or matrix; then the roller is removed from the sheet which remains applied against its matrix until such time as the material of the Celluloid sheet has been suitably softened and has penetrated into all depressions of the mould; then, when moulded, the said sheet is separated from the mould; it can be used for various purposes; for instance, it can be:

(a) Applied on a plate-glass or pane to which it is fixed by a transparent cement, (b) Arranged between two plate-glasses or panes, (c) Mounted and stretched in a frame, such as a lead-frame.

Of course, when the moulded sheet is applied on one plate-glass or pane or arranged between two plate-glasses or panes, then, it can be mounted in a frame such as a lead-frame.

What I claim is:

1. A process of manufacturing and decorating an article permeable to the luminous rays, which comprises preparing a first resistant carrier of flexible material with a grid of juxtaposed reliefs and depressions which cannot be individually distinguished by the naked eye under normal conditions of observation, pressing said first carrier against a second carrier of a more flexible material at a predetermined region of a surface of said second carrier whereby to mold into the surface of said second carrier throughout said region a first impression of said reliefs and depressions of the grid, changing the orientation of said first carrier relative to the position at which said first impression was made and thereupon pressing it into another region of the second carrier to produce a second impression having a differing orientation from that of the first, and continuing the changing of orientation and the imprinting whereby to produce on said second carrier a surface constituting a matrix having regions of selected sizes and shapes formed by grids of juxtaposed reliefs and depressions at different orientations, and bringing a plastic material into contact with said matrix to produce an article having a surface decoration which is a counterpart of said matrix, said material being permeable to luminous rays whereby light upon encountering the selectively oriented reliefs and depressions of said regions will effect display of said decoration.

2. A process of manufacturing and decorating an article permeable to the luminous rays, which comprises preparing a first resistant carrier of flexible material with a grid of juxtaposed reliefs and depressions which cannot be individually distinguished by the naked eye under normal conditions of observation, pressing said first carrier against a second carrier of a more flexible material at a predetermined region of a surface of said second carrier whereby to mold into the surface of said second carrier throughout said region a first impression of said reliefs and depressions of the grid, changing the orientation of said first carrier relative to the position at which said impression was made and thereupon again pressing it into said other region of the second carrier to produce a second impression having a differing orientation from that of the first, and continuing the shifting and changing of orientation and the imprinting whereby to produce on said second carrier a surface constituting a matrix having regions of selected sizes and shapes formed by grids of juxtaposed reliefs and depressions at different orientations, preparing from said matrix a counterpart thereof, and pressing a thin film of a plastic material between said matrix and its counterpart to produce an article having upon its opposite surfaces a decoration which at one surface is a counterpart of said matrix and at the other surface is identical with said matrix, said material being permeable to luminous rays whereby light upon encountering the selectively oriented reliefs and depressions of said regions will effect display of said decoration.

3. A process of manufacturing and decorating an article permeable to the luminous rays, which comprises preparing a first resistant carrier of flexible material with a grid of juxtaposed parallel ribs and grooves which cannot be individually distinguished by the naked eye under normal conditions of observation, pressing said first carrier against a second carrier of a more flexible material at a predetermined region of a surface of said second carrier whereby to mold into the surface of said second carrier throughout said region a first impression of said ribs and grooves of the grid, changing the orientation of said first carrier relative to the position at which said first impression was made and thereupon pressing it into another region of the second carrier to produce a second impression having a differing orientation from that of the first, and continuing the changing of orientation and the imprinting whereby to produce on said second carrier a surface constituting a matrix having regions of selected sizes and shapes formed by grids of juxtaposed ribs and grooves at different orientations, and pressing a hot thermoplastic material into contact with said matrix to produce an article having a surface decoration which is a counterpart of said matrix, said material being permeable to luminous rays whereby light upon encountering the selectively oriented ribs and grooves of said regions will effect display of said decoration.

4. A process of manufacturing and decorating an article permeable to the luminous rays, which comprises preparing a first resistant carrier with a grid of juxtaposed parallel ribs and grooves which cannot be individually distinguished by the naked eye under normal conditions of observation, pressing a part of said first carrier against a second carrier at predetermined regions of a surface of said second carrier whereby to mold into the surface of said second carrier throughout said regions first impressions of said ribs and grooves of the grid, changing the orientation of said first carrier relative to the position at which said first impressions were made and thereupon pressing it into other regions of the second carrier to produce second impressions having a differing orientation from that of the first impressions whereby to produce on said second carrier a surface constituting a matrix having regions of selected sizes and shapes formed by grids of juxtaposed ribs and grooves at different orientations, and pressing a sheet of softened organic plastic material into contact with said matrix to produce an article having a surface decoration which is a counterpart of said matrix, said material being permeable to luminous rays whereby light upon encountering the selectively oriented ribs and grooves of said regions will effect display of said decoration.

5. A process of manufacturing and decorating an article permeabale to the luminous rays, which comprises preparing a first resistant carrier with a grid of juxtaposed parallel ribs and grooves which cannot be individually distinguished by the naked eye under normal conditions of observation, pressing said first carrier against a second carrier of a flexible material at a predetermined region of a surface of said second carrier whereby to mold into the surface of said second carrier throughout said region a first impression of said ribs and grooves of the grid, changing the orientation of said first carrier relative to the position at which said first impression was made and thereupon pressing it into other regions of the second carrier to produce second impressions having a differing orientation from that of the first, and continuing the changing of positive orientation and the imprinting whereby to produce on said second carrier a surface constituting a matrix having regions of selected sizes and shapes formed by grids of juxtaposed ribs and grooves with successive areas at different orientations, and pressing a plastic material into contact with said matrix to produce an article having a surface decoration which is a counterpart of said matrix, said material being permeable to luminous rays whereby light upon encountering the selectively oriented ribs and grooves of said regions will effect display of said decoration.

PIERRE MICHEL LOUIS LATROBE.